(12) United States Patent
Barneron

(10) Patent No.: US 10,175,771 B2
(45) Date of Patent: Jan. 8, 2019

(54) SECURED COMPACT KEYBOARD

(71) Applicant: INGENICO GROUP, Paris (FR)

(72) Inventor: Sylvain Barneron, Bourg-les-Valence (FR)

(73) Assignee: INGENICO GROUP, Paris (FR)

( * ) Notice: Subject to any disclaimer, the term of this patent is extended or adjusted under 35 U.S.C. 154(b) by 0 days.

(21) Appl. No.: 15/159,370

(22) Filed: May 19, 2016

(65) Prior Publication Data

US 2016/0342223 A1 Nov. 24, 2016

(30) Foreign Application Priority Data

May 22, 2015 (FR) ...................................... 15 54662

(51) Int. Cl.
*G06F 3/02* (2006.01)
*G06F 21/86* (2013.01)
*G06F 21/83* (2013.01)

(52) U.S. Cl.
CPC ............ *G06F 3/0202* (2013.01); *G06F 21/83* (2013.01); *G06F 21/86* (2013.01)

(58) Field of Classification Search
CPC ......... G06F 3/0202; G06F 21/83; G06F 21/86
See application file for complete search history.

(56) References Cited

U.S. PATENT DOCUMENTS

2001/0035334 A1* 11/2001 Andersson ........... H01H 13/702 200/5 A
2003/0229795 A1* 12/2003 Kunigkeit ............... G06F 21/83 713/189
2004/0204009 A1* 10/2004 Cheng .................... H01Q 1/245 455/550.1
2006/0250377 A1 11/2006 Zadesky et al.
2010/0252405 A1* 10/2010 Chen ...................... G06F 3/0202 200/314
2011/0095919 A1* 4/2011 Ostermoller ............ G06F 3/044 341/33
2013/0210576 A1* 8/2013 Bilang-Heier ......... A63B 22/02 482/1
2014/0104173 A1* 4/2014 Bruno ................... G06F 3/0202 345/168
2014/0203953 A1 7/2014 Moser et al.
2014/0217169 A1 8/2014 Lewis et al.

OTHER PUBLICATIONS

French Search Report and Written Opinion dated Jan. 13, 2016 for corresponding French Application No. 1554662, filed May 22, 2015.

* cited by examiner

*Primary Examiner* — Abbas Abdulselam
(74) *Attorney, Agent, or Firm* — David D. Brush; Westman, Champlin & Koehler, P.A.

(57) ABSTRACT

A keyboard of a data entry device includes a printed circuit board, a spacer having a plurality of key-positioning locations, a plurality of keys, each key being disposed so as to be at least indirectly in contact with a corresponding key imprint on the printed circuit board and a plate of transparent material in which holes corresponding to each key are made. The printed circuit board, the spacer and the plate of transparent material are applied so as to constitute an assembly that is non-dismountable from the exterior of the data entry device.

9 Claims, 2 Drawing Sheets

SECURED COMPACT KEYBOARD

1. FIELD OF THE INVENTION

The present technique relates to the securing of keyboards. More particularly, the present technique relates to the securing of keyboards for secured entry (or keying-in) devices, such as payment terminals or pinpads. Indeed, such secured entry devices are used on a daily basis to receive data from users. These pieces of data are highly confidential and need to be protected from attempts to copy or steal them. These pieces of data are for example confidential codes that are entered by users when they wish to make payment on a payment terminal. These pieces of data can also be passwords or personal identification codes which are entered on a keyboard of a device giving access to goods or services.

2. PRIOR ART

In payment terminals or in secured entry devices, protection must be obtained against attempts at fraud. Thus, protective measures are implemented. These protective measures are measures either for protecting hardware or for protecting software. Measures for protecting hardware include especially techniques to protect the terminal keyboard. It is necessary especially for example to avert any attempt to recover a personal identification code and more generally to spy on or bug the keyboard.

In older-generation terminals, the size of the terminal itself and the size of the keys of the terminal keyboard make it possible to separate the keys by varying distances. This is useful because techniques known as "false-key techniques" are used to increase security and to verify that the terminal has not undergone any attempt at dismantling (and especially to check on any unauthorized attempt open the terminal in order to insert a bug into this terminal so as to retrieve signals from the keys struck by the user). A payment terminal classically comprises an upper half-shell and a lower half-shell. The upper half-shell has apertures used for example to allow the keys of the keyboard to pass through. The upper half-shell also has an aperture for the display screen of the terminal. At the keyboard, the false-key devices are used to ascertain, on the one hand, that the upper half-shell of the terminal is properly truly fitted into the lower half-shell and, on the other hand, that the false keys rest on at least one printed circuit board (motherboard) present in the payment terminal. It is thus possible to be sure that the payment terminal is not open and that there has not been any attempt to introduce a bug into the keyboard of the payment terminal for example. The false keys are pressed for example by means of a plastic extension (which may or may not be a full or solid element) extending from the inside of the upper half-shell and taking position on the false key of the printed circuit board (motherboard). This prior-art solution is generally fairly efficient. Nonetheless, this approach is quite old and does not necessarily suit new types of payment terminals. Indeed, this prior-art solution raises at least two problems. The first problem relates to the fact that it is difficult to create such false keys when the keys are laid out compactly and close to each other. Indeed, the prior-art solution requires relatively large spaces between the keys so that that plastic extensions stretching towards the interior of the upper half-shell can cross the keyboard and be positioned on the false key of the motherboard. Now, the goal of reducing the size of the payment terminals means that there will not necessarily be any space available for such plastic extensions. In addition, the plastic extensions also result in substantial thickness in the product. To reduce the size of the payment terminals, the thickness of the terminals too must be limited. The classic false-key system implies a compression (i.e. a pre-stressing or, in other words, extra length) in order to withstand the deformation of the covers, for example through heat or because the product has suffered a fall.

A second problem relates to the manufacturing of the plastic extension itself and, from a general viewpoint, the manufacturing of the upper half-shell. This manufacturing raises problems as regards both aesthetics and security. From the aesthetic viewpoint, on the external, visible face of the upper half-shell the presence of extensions gives rise to a slight hollow deformation at the position in which this extension is located. This is because the lower half-shell and the upper half-shell, like most of the other plastic parts needed to manufacture the terminal, are manufactured by means of an injection method in which hot plastic is introduced under pressure into a mold. The injection of plastic gives rises to deformation at certain positions of the parts, for example at the extensions. The problem of security arises out of this problem of aesthetic appearance. Indeed, an attacker knows precisely where the false keys are situated by observing the keyboard.

The deformations present between the keys, at the positions where the plastic extensions stretch towards the false keys placed on the motherboard of the terminal, make it possible to easily identify the locations of these false keys and therefore provide the attacker with information on the positions at which there are no false keys. The hacker can then try to pierce the upper half-shell in order to introduce a bug therein.

One solution to this problem could be to cover the upper half-shell with a film or casing used to mask these deformations and these imperfections. Unfortunately, this approach would not resolve the problem of space available for the plastic extensions. Another solution could be could be to use a different plastic material that does not have these problems of deformation. Not only does this solution not resolve the problem of available space, in length and width as well as thickness but it is also more costly.

3. SUMMARY OF THE INVENTION

The present disclosure resolves at least some of the problems posed by these prior-art terminals. Indeed, the present technique relates to a keyboard of a data entry device, a keyboard of the type comprising a printed circuit board, a spacer comprising a plurality of key-positioning locations, a plurality of keys, each key being disposed so as to be at least indirectly in contact with a corresponding key imprint on said printed circuit board and a plate of transparent material in which holes corresponding to each key are made.

Such a keyboard is characterized by the fact that the printed circuit board, the spacer and the plate of transparent material are applied so as to constitute an assembly that is non-dismountable from the exterior of the data entry device.

Thus, the keyboard cannot be dismounted. This means that it is not necessary to provide for elements, on this keyboard, to detect any opening of this keyboard. Depending on the embodiments, the printed circuit, the spacer and the plate of transparent material are for example glued together or again screwed together from the interior.

According to one particular characteristic, said plurality of keys comprises keys made of deformable material.

According to one particular characteristic, said plurality of keys is divided into a predetermined number of series of keys, each series of keys constituting an independent element comprising a base, said base resting at least indirectly on said printed circuit.

According to one particular embodiment, said base furthermore has a shape complementary to a key-positioning location of said spacer.

Thus it is not possible to make a mistake when assembling the keys on the keyboard.

According to one particular characteristic, said base extends beneath the plate of transparent material over a predetermined length.

According to one particular characteristic, a predetermined length is determined as a function of the thickness of said plate of transparent material.

Thus, the spacer cannot be machined without destroying the plate of transparent material, thus making any attempt at hacking visible.

According to one particular characteristic, the keyboard comprises a dome foil acting as an interface between said printed circuit board and said keys.

According to another aspect, the present invention also relates to a payment terminal comprising a keyboard as described here above.

4. DRAWINGS

Other features and advantages shall appear more clearly from the following description of a particular embodiment of the disclosure, given by way of a simple, illustrative and non-exhaustive example and from the appended drawings, of which:

5. DESCRIPTION

5.1. Reminders

The general principle of the technique described consists in replacing the function of pressure on false keys by a novel keyboard architecture. Complementarily, the keyboard architecture also brings into question the way in which the signals of the keyboard are protected. Such a keyboard architecture is perfectly suited to the keyboards of secured entry devices, such as for example payment terminals or pinpads. This approach is particularly well suited to small-sized keyboards which must be placed for example in compact devices.

The basic principle of the present technique is that it makes at least certain parts of the keyboard non-dismountable from the exterior (i.e. from the exterior of the data entry device when the terminal is mounted in this data entry device). Indeed, as indicated here above, false keys are needed because they enable the detection of an unauthorized opening of the terminal (especially by an attacker). In the principle of the technique, it is not possible to dismount the keyboard from the exterior, and hence the use of false keys is not necessary.

Here below and for the preceding part of this document, it is understood that a keyboard, as understood in the present document, comprises a keypad (made of silicone or any deformable material, or even a mechanical keypad) comprising a certain number of keys. When the terminal or the pinpad is mounted, the keys of this keypad are situated so as to be facing contact pads mounted on the motherboard. Pressing a key on the keypad causes pressure on the corresponding contact pad of the motherboard. Between the "regular" contact pads corresponding to real keys of the keyboard, security contact pads which are called "false keys" are laid out. These security pads are pressed, during the operation of the data entry device. If one of the security pads is not pressed or no longer pressed, the device goes into intrusion mode and carries out security measures (the erasure of the memory for example).

Figure 1:
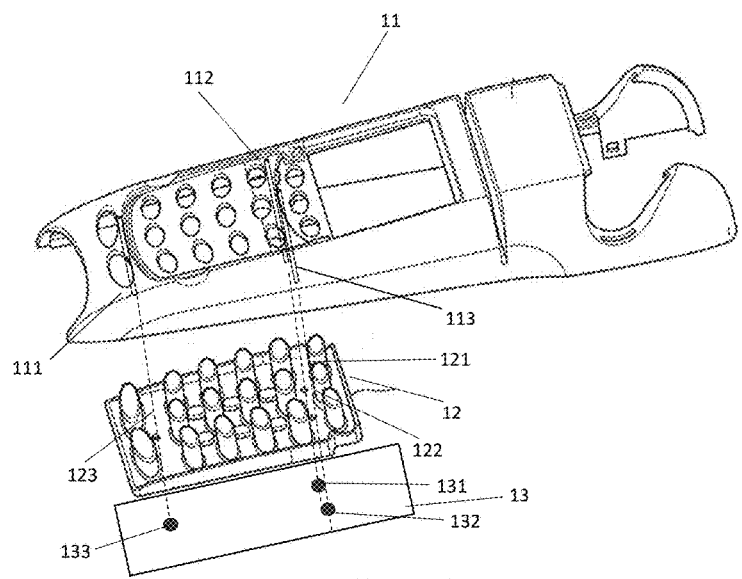
FIG. 1 is a schematic view of a prior-art payment terminal.

By way of an indication, one example of a prior-art terminal is described with reference to FIG. 1. FIG. 1 illustrates the structure of a prior-art payment terminal. This payment terminal comprises an upper half-shell 11, a keypad made of silicone keys 12 forming flexible keys of a keyboard and possibly a light guide (not shown), a motherboard 13 and a lower half-shell not shown. During the mounting of the payment terminal, the upper half-shell 11 and the lower half-shell are assembled and get fitted with the keypad 12 and the motherboard 13. The plastic extensions 111, 112 and 113 extend from the interior of the upper half-shell crossing the keypad made of silicone 12 (and the light guide if it exists) by orifices 121, 122 and 123 and apply pressure on the false keys 131, 132 and 133 of the motherboard 13 (the extensions can be provided with complementary elements to exert pressure on the false keys, such as silicone pucks). When the terminal is opened, the extensions move away from the false keys. This opening (intrusion) is thus detected by the detection circuits connected to the false keys and enables the activation of a mechanism to protect the terminal (consisting for example in erasing the secured memories of the terminal). By contrast, when the attacker knows the location of the false keys (because of the deformations of the plastic material of the upper half-shell), he can easily hack the terminal by trying to pierce the upper half-shell in order to introduce a bug therein or again to apply pressure on the false keys even if the terminal should be dismounted.

To compensate for the absence of false keys which are not easy to implement because of the compactness of the entry device, the inventors have had the idea of making the keyboard non-dismountable. Since the keyboard is non-dismountable, there cannot be any attempt to dismount it. The term "non-dismountable" is understood to mean that at least certain elements constituting the keyboard cannot be easily separated from one another.

In general, the technique is defined as being a keyboard of a data entry device, of the type comprising a printed circuit board, a spacer comprising a plurality of key-positioning locations, a plurality of keys, each key being disposed so as to be at least indirectly in contact with a corresponding key imprint on said printed circuit and a plate of transparent material in which holes corresponding to each key are made, the key being characterized in that the printed circuit board, the spacer, the plate of transparent material are applied in such a way as to constitute a non-dismountable unit.

More particularly, in one embodiment, these constituent elements of the keyboard are glued to one another. It can also be envisaged to screw these elements to one another by the rear (i.e. the screws are screwed to the rear of the keyboard, i.e. once the keyboard is mounted, the screws are situated within the terminal and they cannot be detected by an attacker and the keyboard cannot be dismounted through the exterior of the entry device).

This means that an attacker who cannot dismount the keyboard must try and directly penetrate it. In order to limit or even rule out any attempts to penetrate the keyboard, novel security measures are associated with this keyboard. One security measure is derived from the fact that the keyboard cannot be dismounted. Indeed, since the keyboard cannot be dismounted, it is not possible to try and penetrate the terminal by removing a part of the keyboard without leaving visible traces of this attempt—as it is the case with the prior-art terminals.

Besides, in at least one embodiment, the keys of the keyboard are shaped in order to indicate a visible deterioration of the keyboard should there be an attempt to break in. Indeed, since the keyboard cannot be dismounted, the hacker must necessarily pass through the keyboard to try and penetrate the data entry device. This means that the attacker must try and pierce the keyboard to access either the keys or the interior of the data entry device.

The keyboard such as the one described with reference to the present technique does not have the drawbacks of the prior art. Indeed, the fact of having available a keyboard that cannot be dismounted intrinsically limits attempts to penetrate this keyboard. Besides it is not possible to penetrate the secured zone protected by this keyboard.

In at least one embodiment, the non-dismountable character of the keyboard is obtained by gluing together the different elements of the keyboard. More particularly, the non-dismountable character of the keyboard is obtained by gluing together the different layers forming the keyboard, except for the keys made of deformable material (for example silicone). The paradigm underlying this embodiment consists in considering that since the space needed for the keyboard is limited, it is no longer individual access to the keys that needs to be controlled but rather simultaneous access to all the keys.

Indeed, one process for hacking a keyboard as referred to here above consists of the insertion into the terminal of a snooper device or bug. This bug is used to detect the use of keys of the keyboard by the user. This for example enables the bug to retrieve passwords or personal identification codes (PIN codes). This data is then transmitted to the attacker. For the bug to be able to fulfill its function, it must be connected to each of the keys of the keyboard. Conductive wires should then be connected to each of the keys of the keyboard.

The principle of the technique described consists in preventing or greatly limiting the possibility of connecting these wires to a bug by making the keyboard as compact as possible while at the same time configuring the keys so that they limit the possibilities of snooping.

5.2. Description of One Embodiment

Figure 2:
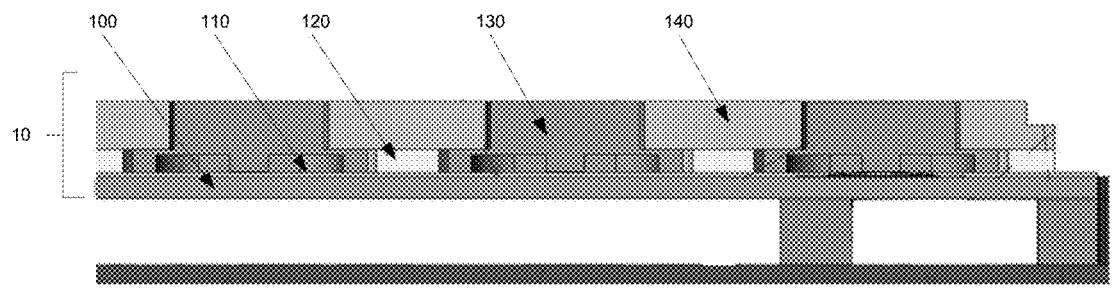
FIG. 2 illustrates one embodiment of the keyboard according to the present technique.
Figure 3:
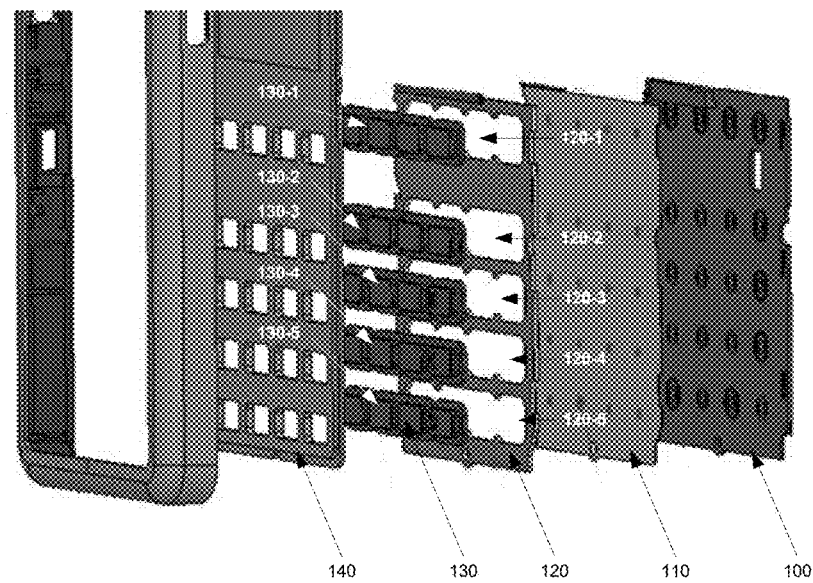
FIG. 3 illustrates the mounting of the keyboard according to the embodiment of FIG. 2.
Figure 4:
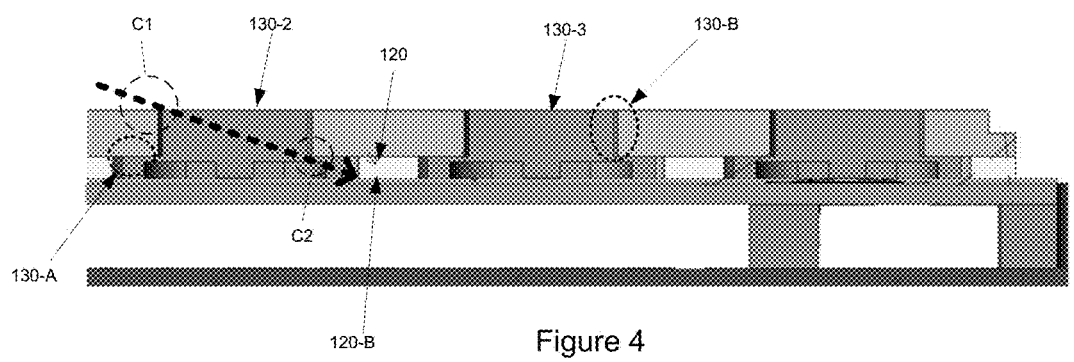
FIG. 4 illustrates an attempt to pierce the keyboard of FIG. 2.

In one embodiment presented with reference to FIGS. 2, 3 and 4, a keyboard 10 consists of an assembly comprising a printed circuit board (PCB) 100. This printed circuit board comprises a certain number of dual contact rings (or contact targets) in the form of copper tracks (or contact rings and pins). These dual rings represent the keys of the keyboard. One dual contact ring corresponds to one key. A dual contact ring works according to a principle of pressurizing a dome: the base of the dome is in permanent contact with the external ring while the central part of the dome is not in contact with the central ring (or pin) unless the corresponding key is pressed. This results in the setting up of a circuit between the external ring and the central ring (or pin) and therefore the detection of the pressure of the key by the processor. Thus, the keyboard 10 also has a dome foil 110 that is positioned above the printed circuit 100, wherein the dome is positioned above a double contact ring. A spacer 120 is positioned above the dome foil 110. This spacer is used to position the keys 130. In this embodiment, the spacer 120 defines five locations (120-1, 120-2, 120-3, 120-4, 120-5) of four series of keys (130-1, 130-2, 130-3, 130-4, 130-5). In this embodiment, the series of keys are formed by bands of flexible and deformable material, for example silicone or rubber bands. This way of laying out the keys in series is advantageous because it facilitates the assembling of the keyboard. Besides, the series of keys (130-1, 130-2, 130-3, 130-4, 130-5) have different external patterns. An external pattern is, so to speak, the shape of the base of the series of keys. An external pattern of a series of keys corresponds to only one, single pattern of location on the spacer. This means that the operator who carries out the assembling of the keyboard cannot make a mistake when positioning the keys of the keyboard because, once the spacer 120 is positioned, each location (120-1, 120-2, 120-3, 120-4, 120-5) corresponds only to one given series of keys. This means that it is not possible to insert a series of keys that does not correspond to a location pattern. Depending on the embodiments, the spacer can also fulfill the function of a light guide. The assembly is then covered with a glass plate 140 (or a plate made of equivalent transparent material) in which orifices are made. Each orifice of this glass plate corresponds to a key of the keyboard. In this embodiment, the total thickness of the keyboard thus obtained is less than four millimeters. The keyboard obtained is also highly secured. Indeed, to prevent the use of the above protection solutions, specific to the mechanical keyboard, the glass plate 140, the spacer 120, the dome foil 110 and the keyboard PCB 100 are strongly bonded to each other in order to create only one sub-assembly. The keyboard assembly obtained is thus non-dismountable.

Thus, any attempt by an attacker to unglue one of the elements necessarily causes the keyboard PCB 100 to be lifted (even minimally). This lifting is detected by complementary security features situated beneath the keyboard PCB 100 (such as for example a Zebra elements or false keys). The lifting of the keyboard PCB then enables the detection of the break-in following, for example, a loss of contact of Zebra elements serving to protect a secured zone.

As an alternative, rather than having to define precise gluing points for the dome foil 110, this dome foil is "buried" in the thickness of the spacer 120 in order to optimize the thickness and is not glued on, thus enabling it to get deformed in order to actuate the keys.

Besides, another valuable feature of this approach is that it enables protection from what is called the "middle layer" type of attack. This type of attack consists of the insertion of an electronic monitoring device that is connected to the keys of the keyboard. This type of device enables the reading of the data input at the keyboard. It requires the insertion of a wire in series on all the keys of the keyboard, the wire being then connected to the electrical monitoring device. As a general rule, the wire is positioned beneath the physical keyboard and is therefore invisible to the user. The keyboard of this embodiment makes it possible to take measures against this type of attack.

Indeed, with this approach, the attacker can easily access the keys one by one. Indeed, since the keys are made of deformable material, it is easy to access a key. By contrast, the attacker cannot make wires pass through up to the bug for the keys situated at the center of the keyboard: if the attacker wishes to make wires pass from key to key without this being visible, he has to machine the spacer 120 (i.e. to make holes in the spacer). This cannot be done without destroying the glass plate 140.

Indeed, as illustrated in FIG. 4, the passing of a wire from one series of keys to another requires a piercing (represented by the dashed arrow). The piercing must be done at the end point of the arrow to make the wire pass from the first series of keys (130-2) to the second series of keys (130-3). In order that it may not be visible, the wire must pass in the spacer 120. Now, to piece a hole in the spacer 120, the attacker must necessarily damage the glass plate 140 either in its upper part (C1) or in its lower part (C2). This technical effect (the fact of necessarily destroying the glass plate during a piercing operation) is obtained through the configuration of the series of keys (and/or of the spacer) in combination with the glass plate. Indeed, the width of the base of the series of keys 130-A (or the width of the spacer between the series of keys 120-B) is chosen so that glass plate will necessarily deteriorate in the event of machining. This width (130-A) is for example greater than or equal to the height of the glass plate (130-B). This means that it is not possible to pierce the spacer without destroying the glass plate.

In one additional embodiment, the glass plate 140 is screen-printed on its rear face: the attack known as the "middle layer" attack is then even more visible than when the glass window is not screen-printed.

Naturally, the characteristics and embodiments described here above can be combined with each other.

The invention claimed is:

1. A keyboard of a data entry device, the keyboard comprising:
   a top upper plate of transparent material;
   a spacer comprising a plurality of key-positioning locations, located under said upper plate of transparent material;
   a printed circuit board located under the spacer; and
   a plurality of keys, each key being disposed so as to be at least indirectly in contact with a corresponding key imprint on said printed circuit board and the plate of transparent material in which holes corresponding to each key are made, wherein each key passes through one of the key position locations and a respective one of the plurality of holes in the top upper plate, and wherein the printed circuit board, the spacer and the plate of transparent material are applied so as to constitute an assembly that is non-dismountable from the exterior of the data entry device.

2. The keyboard according to claim 1, wherein said plurality of keys comprises keys made of deformable material.

3. The keyboard according to claim 1, wherein said plurality of keys is divided into a predetermined number of series of keys, each series of keys constituting an independent element comprising a base, said base resting at least indirectly on said printed circuit.

4. The keyboard according to claim 3, wherein said base furthermore has a shape complementary to a key-positioning location of said spacer.

5. The keyboard according to claim 3, wherein said base extends laterally beneath the plate of transparent material over a predetermined length.

6. The keyboard according to claim 5, wherein the predetermined length is determined as a function of the thickness of said plate of transparent material.

7. The keyboard according to claim 6, wherein the predetermined length of the base is greater than the thickness of said plate of transparent material.

8. The keyboard according to claim 1, wherein the keyboard further comprises a dome foil acting as an interface between said printed circuit board and said keys.

9. A payment terminal comprising:
   a keyboard, which comprises:
   a top upper plate of transparent material;
   a spacer comprising a plurality of key-positioning locations, located under said upper plate of transparent material;
   a printed circuit board located under the spacer; and
   a plurality of keys, each key being disposed so as to be at least indirectly in contact with a corresponding key imprint on said printed circuit board and the plate of transparent material in which holes corresponding to each key are made, wherein each key passes through one of the key position locations and a respective one of the plurality of holes in the top upper plate, and wherein the printed circuit board, the spacer and the plate of transparent material are applied so as to constitute an assembly that is non-dismountable from the exterior of the data entry device.

* * * * *